United States Patent [19]
Abry et al.

[11] Patent Number: 5,993,608
[45] Date of Patent: Nov. 30, 1999

[54] PROCESS FOR RECOVERING PROCESSING LIQUIDS

[75] Inventors: Raymond G. Abry, Calgary; Todd S. Beasley, Brooks, both of Canada; Stephen W. Carlson, Houston, Tex.; Stephen G. Kresoyak, Calgary, Canada

[73] Assignee: Canadian Chemical Reclaiming Ltd., Canada

[21] Appl. No.: 08/846,036

[22] Filed: Apr. 25, 1997

[51] Int. Cl.$^6$ ................................ B01D 3/10; B01D 3/42
[52] U.S. Cl. ..................... 203/11; 159/48.1; 159/DIG. 4; 159/DIG. 16; 203/2; 203/20; 203/73; 203/75; 203/14; 203/77; 203/78; 203/80; 203/90
[58] Field of Search ................................. 203/1.4, 80, 77, 203/1, 40, 11, 90, 73, 2, 78, 20, 74–75, 100; 202/205, 236, 160, 237; 159/48.1, DIG. 4, 44, DIG. 16; 95/242–243, 251; 210/774; 564/497; 568/913, 868

[56] References Cited

U.S. PATENT DOCUMENTS

| | | | |
|---|---|---|---|
| 3,676,485 | 7/1972 | Lewis et al. | 202/197 |
| 3,803,005 | 4/1974 | Miserlis et al. | 203/84 |
| 4,261,814 | 4/1981 | Pfeifer | 208/356 |
| 4,315,815 | 2/1982 | Gearhart . | |
| 4,770,747 | 9/1988 | Muller . | |
| 4,844,812 | 7/1989 | Haynes et al. | 210/741 |
| 4,942,223 | 7/1990 | Takao et al. | 528/501 |
| 5,076,895 | 12/1991 | Greenfield et al. | 203/73 |
| 5,152,887 | 10/1992 | Beasley et al. . | |
| 5,158,649 | 10/1992 | Beasley et al. . | |
| 5,389,208 | 2/1995 | Beasley et al. . | |
| 5,441,605 | 8/1995 | Beasley et al. . | |
| 5,458,739 | 10/1995 | Boucher et al. . | |

OTHER PUBLICATIONS

Hayhoe, Philip: "Glycol Purification—a Novel Approach to an Old Problem," *NZ Engineering*, Jun., 1993, pp. 12–13.

*Primary Examiner*—Virginia Manoharan
*Attorney, Agent, or Firm*—Browning Bushman

[57] ABSTRACT

A process for recovering processing liquids such as gas-treating liquids wherein a feed mixture containing the processing liquid and components or impurities that are more volatile and less volatile than the processing liquid is initially heated in a first heating zone to a temperature sufficient to volatilize at least one of the more volatile components and a portion of the processing liquid, the temperature being maintained below the decomposition temperature of the processing liquid to produce a vapor stream containing the less volatile component and the vaporized portion of the processing liquid and a residuum containing the processing liquid, a reduced concentration of the more volatile components and the less volatile components, the vapor stream being separated from the residuum in a first separation zone, a portion of the residuum being passed through a second heating zone at a temperature below the decomposition temperature of the processing liquid to produce a first heated recycle stream, the heated recycle stream being admixed with the feed mixture to effect the initial heating of the feed mixture, the concentration of the less volatile components in the residuum being reduced, preferably on a continuous basis, any processing liquid present in the vapor stream being recovered for further use.

15 Claims, 2 Drawing Sheets

PROCESS FOR RECOVERING PROCESSING LIQUIDS

BACKGROUND OF THE INVENTION

1. Field of the Invention

The present invention relates to process for recovering a processing liquid and, more particularly, to a process for recovering a processing liquid from a mixture comprising the processing liquid, at least one component that is more volatile than the processing liquid, and at least one component that is less volatile than, and can be dissolved or suspended in, the processing liquid.

2. Description of the Prior Art

There are numerous industrial processes wherein a liquid, hereinafter referred to as a processing liquid, which can comprise one or more components, is used in such a fashion that it becomes contaminated with, or contains, various components, some of which are more volatile than the processing liquid and some of which are less volatile and can be dissolved in the processing liquid. Usually, the components in the processing liquid are contaminants, although they may be desirable, recovered components, depending on the process in which the processing liquid is used. In such cases, it is almost universally desirable to separate the processing liquid from the less volatile and more volatile components so that the processing liquid can be reused in the process or simply recovered in a substantially pure state for reuse or other uses.

Numerous examples of the above described general scheme of using a processing liquid abound. For example, it is well known that natural gas produced from oil and gas wells, in addition to containing gaseous hydrocarbons, such as methane, ethane, etc., almost invariably contains water and acidic gases, such as $CO_2$ and $H_2S$. In cases where the natural gas contains water, it is very common for so called gas hydrates or clathrate hydrates to form. These clathrate hydrates are crystalline compounds that occur when water forms a cage-like structure around guest molecules, particularly gaseous molecules.

While the phenomena can occur in any system wherein there is water and gaseous compounds, e.g., hydrocarbons, the problem, at times, becomes especially acute in the petroleum industry, not only with respect to the production of gaseous hydrocarbons such as natural gas, but also in the transporting and processing of natural gas. As noted, typical gas hydrates formed in petroleum (hydrocarbon) environments are composed of water and one or more guest molecules, such as methane, ethane, propane, isobutane, nitrogen, carbon dioxide, and hydrogen sulfide. However, it is also known that other guest molecules such as nitrous oxide, acetylene, vinyl chloride, ethyl bromide, oxygen, etc., can form clathrate hydrates.

With particular reference to natural gas systems and by example only, when gas hydrate crystals form, they can become a nuisance at least and pose a serious problem at worst. Gas hydrates can block transmission lines and plug blowout preventers, jeopardize the foundations of deepwater platforms and pipelines, collapse tubing and casing, and foul process equipment, such as heat exchangers, compressors, separators, and expanders. To overcome these problems, several thermodynamic measures are possible in principal: removal of free water, maintaining an elevated temperature and/or reduced pressure, or the addition of freezing point depressants. As a practical matter, the last mentioned measure, i.e., adding freezing point depressants, has been most frequently applied. Thus, lower alcohols, such as methanol, ethanol, etc., and glycols have been added to act as antifreezes.

While processing liquids such as alcohols and glycols used in natural gas production, transportation, and processing are effective at reducing gas hydrate formation, their use is not without problems. As is well known, the production of natural gas is frequently accompanied by the production of brine, containing sodium chloride and other water-soluble salts. While these halides, such as the alkali metal halides, are readily soluble in water, they also exhibit substantial solubility in the alcohols and glycols used to prevent gas hydrate formation. Accordingly, the processing liquid—in this case the alcohol, glycol, or the like—becomes contaminated with dissolved salts present in the produced water, as well as with certain gases, which, depending on the particular gas, are soluble in the processing liquid. Thus, this presents a specific example where a processing liquid has been used, in this case to prevent hydrate formation, and has now become contaminated with a more volatile component and a less volatile, and in this case dissolved, component.

Again, using the example of natural gas production, transportation, and processing, it is necessary that the natural gas be freed of acidic components, such as $CO_2$, $H_2S$, sulfur oxides, etc., some of which are quite toxic, all of which can lead to severe corrosion problems and in certain cases the formation of unwanted by-products. It is common to scrub the natural gas stream with processing liquids such as liquid amines, particularly alkanolamines such as monoethanolamine (MEA); diethanolamine (DEA); methyldiethanolamine (MDEA), as well as glycols such as mono-, di-, or tri-ethylene glycol. Since scrubbing of natural gas to remove acidic gases is normally conducted on natural gas streams that have been substantially freed of water, the dissolved salt content of the natural gas stream from the gas stream is generally quite small. However, even though the ingress of dissolved salt is low from the natural gas stream, continuous use of the amine process liquid for acid gas removal tends to cause the amine to break down with contaminants and create heat-stable, unregenerable salts. If the residual buildup of heat-stable salts (HSS) is permitted to build to typical levels in excess of 1% by weight, the amine performance will decline, corrosion increases rapidly with a decline in pH, and the amine solution begins to foam, creating excessive process liquid losses. Accordingly, the processing liquid, e.g., the alkanolamine, will generally contain dissolved, less volatile components at a much smaller concentration than in the case of an alcohol or glycol used to prevent gas hydrate formation. Nonetheless, even in this instance, the processing liquid now presents a case where, after use, it contains more volatile components, e.g., $CO_2$ $H_2S$, etc., and perhaps a small amount of less volatile and dissolved component.

In the case where treatment of the natural gas to prevent gas hydrate formation and/or remove acidic gases is conducted on offshore platforms, several problems are encountered. For one, the alcohols, glycols, and alkanolamines can be toxic to marine life and accordingly, once spent, e.g., saturated with contaminants that they are being used to remove, cannot be discharged overboard. Aside from ecological concerns, such a method is economically not feasible since it requires a constant replenishment of the processing liquid. Indeed, such a process would not be economically feasible in land-based refineries, chemical plants, or the like.

U.S. Pat. Nos. 5,152,887; 5,158,649; 5,389,208; and 5,441,605 all deal with processes and apparatus for reclaiming and/or concentrating waste aqueous solutions of gas treating chemicals. Additionally, U.S. Pat. Nos. 4,315,815; and 4,770,747 likewise deal with processes for reclaiming or recovering gas-treating liquids. U.S. Pat. No. 5,389,208, incorporated herein by reference for all purposes, discloses and claims a method for reclaiming an impurity-containing waste aqueous solution of a gas-treating chemical that basically involves vacuum distillation of the spent material under temperature conditions that prevent decomposition of the gas-treating chemical and in such a fashion that the process can be operated in apparatuses made of carbon steel, as opposed to more exotic materials of construction, without causing substantial corrosion of the apparatus.

SUMMARY OF THE INVENTION

It is therefore an object of the present invention to provide an improved process for separating a processing liquid from more volatile and less volatile components contained in the processing liquid.

Another object of the present invention is to provide a continuous process for recovery a processing liquid wherein decomposition of the processing liquid is prevented and 95% or more of the processing liquid is recovered essentially free of the more and less volatile components.

Still a further object of the present invention is to provide a process for treating a processing liquid so as to remove from the processing liquid more volatile and less volatile components using, at least in part, processing apparatuses made of carbon steel.

Yet another object of the present invention is to provide a process for separating dissolved and/or suspended solids from a processing liquid under conditions that prevent any substantial degradation of the processing liquid.

The above and other objects of the present invention will become apparent from the drawings, the description given herein, and the appended claims.

According to the process of the present invention, a feed mixture comprising a processing liquid, at least one component that is more volatile than the processing liquid, and at least one dissolved component that is less volatile than the processing liquid is introduced into a first heating zone and initially heated to a temperature sufficient to volatilize at least some of the more volatile component and at least a portion of the processing liquid. The temperature in the first heating zone is maintained below the decomposition temperature of the processing liquid and thereby produces a vapor stream comprising the more volatile component and the vaporized portion of the processing liquid, and a residuum containing the processing liquid, a reduced concentration (perhaps none) of the more volatile component, and the less volatile component. The vapor stream is separated from the residuum in a first separation zone and a portion of the residuum is passed through a second heating zone, also at a temperature below the decomposition temperature of the processing liquid to produce a heated, first recycle stream. The concentration of the less volatile component in the residuum is reduced either by purging a portion through a blowdown stream of the residuum or, when the residuum contains solids of the less volatile component, passing a portion of the residuum through a solids, liquid separation zone to produce a substantially solids-free, second recycle stream and a substantially solids waste stream, the second recycle stream being recycled to the first separation zone.

DESCRIPTION OF THE PREFERRED EMBODIMENTS

Figure 1:
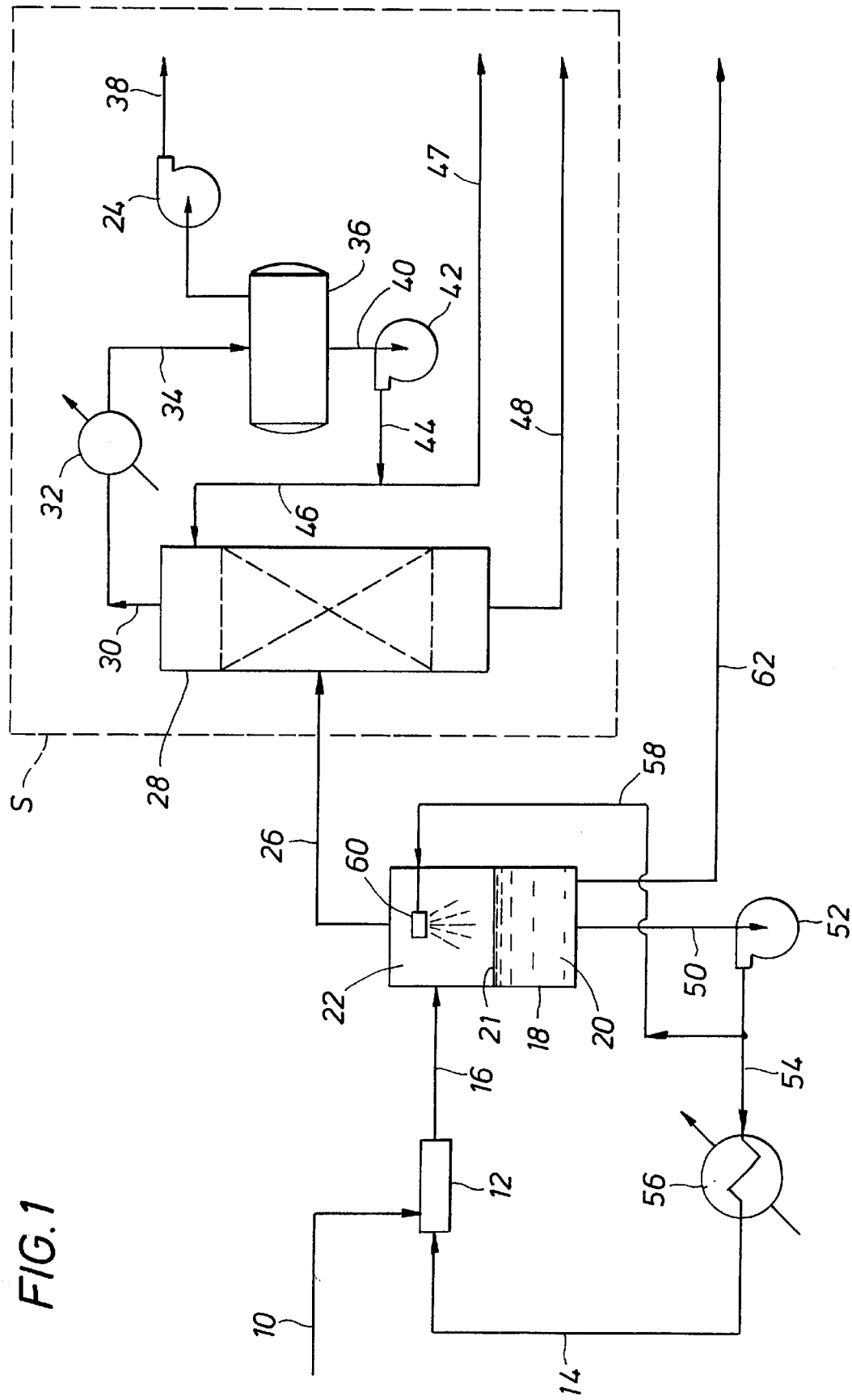
FIG. 1 is a schematic, flow diagram of a first embodiment of the process of the present invention.

The term "processing liquid" as used herein refers to any aqueous or non-aqueous liquid that can contain one or more components and includes, without limitation, gas treating chemicals such as alkanolamines, e.g., monoethanolamine (MEA), diethanolamine (DEA), methyldiethanolamine (MDEA); or glycols such as monoethylene glycol (MEG), diethylene glycol (DEG), triethylene glycol (TEG), tetraethylene glycol (TTEG), and propylene glycol (PEG), as well as halogenated solvents, liquid hydrocarbons including aromatic compounds, olefinic compounds, aliphatic compounds, water, and mixtures of water and other water-miscible materials, etc. Further, a processing liquid as used herein refers to a liquid that is used in a particular process such that it becomes contaminated with, or at least after use contains, components not normally present in the processing liquid. Thus, the processing liquid can be a gas scrubbing medium used to remove undesirable contaminants from gas streams, a selective solvent to recover desirable components from gaseous or liquid streams, a medium used to treat solids to selectively remove certain components of the solids, etc. Accordingly, while in the examples given herein the invention will be described with reference to the scrubbing of gas streams, particularly natural gas streams, it will be understood that the invention is not so limited.

In cases where the processing liquid is used in natural gas operations, non-limiting examples of contaminants or components that may be present in the processing liquid and that need to be removed include acid gases such as hydrogen sulfide, carbon dioxide, sulfur oxides and more volatile liquid components such as water, liquid hydrocarbons, etc. Non-limiting examples of less volatile components or contaminants present in the processing liquid that need to be removed therefrom include inorganic salts such as alkali metal halides; iron salts; salts of organic acids; carbonates; and numerous other organic and inorganic components that are less volatile than the processing liquid and that are dissolved in the process liquid or that are present in generally non-filterable form, e.g., colloidal suspensions. While generally speaking the less volatile component will be a dissolved and/or suspended solid, the latter being generally nonfilterable, it is to be understood that the less volatile component can comprise a liquid that is higher boiling than the processing liquid and that, because it is a liquid, would not normally cause fouling or solid buildup in the lines of the process but that, under certain conditions, can form solids or emulsions and therefore must be removed from the processing liquid. Further, such high boiling liquids may affect the operating efficiency of the processing liquid and therefore must be removed or at least have their concentration reduced in the processing liquid to maintain overall processing liquid performance efficiency.

As used herein, the term "feed mixture" means the processing liquid in admixture with one or more, more volatile components and one or more less volatile components, the concentration of such more or less volatile components being dependent upon the nature of the processing liquid, the type of processing in which the processing liquid is used, and other such factors well known to those skilled in the art. Thus, the feed mixture, as used in the description that follows, refers to the material that is to be treated in accordance with the process of the present invention to reduce or substantially eliminate the more volatile components from the feed mixture and substantially reduce, if not eliminate, the less volatile components from the feed mixture.

As indicated above, depending upon which processing liquid is being used and the conditions under which it is being used, it will contain more or less of the less volatile component, i.e., the dissolved and/or suspended component. In cases where the less volatile component is present in relatively small amounts, e.g., from about 10 ppm to about 60,000 ppm by weight of the feed mixture, and depending on the particular processing liquid employed, reduction of the concentration of the less volatile component can generally be accomplished by purge, e.g. a blowdown stream in the process. Alternately, when the less volatile components in the feed mixture are present in higher amounts, e.g., from about 3 to about 30% by weight, and again depending on the particular processing liquid employed, other steps are necessary to reduce the concentration of the less volatile component in the processing liquid to maximize recovery of the processing liquid.

With reference now to the drawings, FIG. 1 shows a basic process schematic flow diagram of the process of the present invention wherein the feed mixture contains a relatively small amount of less volatile components, e.g., a relatively small amount of dissolved or suspended solid components, i.e., on the order of from 10 ppm to about 60,000 ppm by weight of the feed mixture. Such a case is frequently encountered in the scrubbing of gaseous hydrocarbon streams, e.g., natural gas, using alkanolamines to remove acidic gases. With reference then to FIG. 1, a feed mixture, such as, for example, an alkanolamine such as MEA, that has been used to remove acidic gases from a natural gas stream and that contains acidic gases, water, MEA (the processing liquid), and less volatile components, is introduced via line 10 from a gas processing facility through a flow or line mixer 12, where it is mixed with a recycle stream, described more fully hereafter, introduced into mixer 12 via line 14. Line or flow mixers are employed since it is preferable to operate the process in a continuous manner. Typical of such mixers are jet mixers, injectors, orifices and mixing nozzles, centrifugal pumps, and agitated line mixers. It will be appreciated that while line or flow mixers are preferred, in certain cases, if holding time is desired, agitated vessels may be employed. The mixture of the recycle stream from line 14 and the feed mixture from line 10, after being thoroughly mixed in mixer 12, is introduced via line 16 into a first separation zone that can be considered a still or evaporator 18. As explained hereafter, heat necessary to effect separation in separation zone 18 is imparted to the feed to separation zone 18 by heat transfer, in mixer 12, from the heated recycle stream from line 14 to the feed mixture entering mixer 12 from line 10. As can be seen, separation zone 18 includes a lower, substantially liquid phase zone 20 and an upper, substantially vapor phase zone 22, an interface 21 being formed between zones 20 and 22.

In the embodiment shown in FIG. 1, separation zone 18 is maintained under a substantial vacuum, e.g., at least 16 inches of mercury, by means of a vacuum pump 24, forming part of a downstream, second separation zone (shown as S in phantom). In any event, vapor or gases released from the heated feed mixture in separation zone 18 pass overhead via line 26 to a concentrator, distiller 28, where a light, overhead fraction is removed via line 30 and passed through a condenser 32 and thence via a line 34 into a gas/liquid separator 36, e.g., a gravity separator allowing sufficient stilling time to effect gas/liquid separation. Light, non-condensables are removed from separator 36 via line 24 and are sent via line 38 for recovery, incineration, or other disposal. Liquids separated in separator 36 are removed via line 40, a portion being circulated via pump 42 and lines 44 and 46 as reflux, a portion being removed as a clean water stream via line 47. As noted, it will be understood that in the example given, wherein an alkanolamine is being used as the processing liquid to scrub natural gas, water is present as one of the more volatile components in the feed mixture.

Depending upon the temperature and the degree of vacuum in separation zone 22, a certain amount of the processing liquid is taken overhead via line 26 and introduced into concentrator distiller 28. Once disengaged from the more volatile components, the condensed, substantially clean processing liquid is then removed from concentrator distiller 28 as a bottoms fraction via line 48, where it can be recovered for reuse in the gas scrubbing process, if desired.

The residuum in separation zone 18, comprising liquid phase 20, contains the bulk of the processing liquid, a vastly reduced concentration of any more volatile components, e.g., gases or water, and substantially all of the less volatile components, e.g., higher boiling liquids and/or dissolved and/or suspended solids. A portion of the residuum is removed via line 50 and circulated via pump 52 and line 54 through a second heating zone 56. Second heating zone 56 can comprise apparatuses well known to those skilled in the art and can include, for example, the heater disclosed in U.S. Pat. No. 5,389,208, comprising a tube bundle that is heated by heat exchange with combustion gases from natural gas or other combustible gases, all as taught in U.S. Pat. No. 5,389,208. While heating zone 56 can take many forms, it is preferred that the heating zone be of the tubular type whereby residence times can be kept to a minimum to avoid overheating of the residuum and concomitant decomposition of the processing liquid. To this end, recirculation of the residuum through heating zone 56 is conducted at a flow rate of 10 feet per second or greater, preferably from about 11 to about 16 feet per second. Maintaining these high flow rates through heating zone 56 minimizes the likelihood that there will be excessive heating of fluid in the film zone adjacent the tubing walls, which could cause vaporization and/or degradation of the processing liquid. Furthermore, the high flow rates minimize coking or scaling of the interior tube walls. Lastly, the high flow rate aids, in conjunction with back pressure regulation, discussed more fully hereafter, in preventing vaporization at the tube walls.

To control foaming in separation zone 18, a portion of the residuum stream can be recycled via line 58 and introduced into separation zone 18 in the vapor space portion 22 through spray head 60, which directs a spray of the residuum toward the full interfacial area defined by interface 21 of the vapor space 22 and the liquid space 20. If desired, other foam suppressants by way of additives can be introduced into separation zone 18.

In the embodiment described in FIG. 1, when the amount of the less volatile component in the feed mixture is at a relatively low level, and particularly when such less volatile component is a dissolved and/or suspended solid, precipitation of any dissolved solid can be avoided by proper blowdown or purging of residuum from separation zone 18. In this regard, a blowdown or purge stream of residuum is removed from separation zone via line 62 and discharged as waste. The amount of blowdown or purge via line 62 will be dependent upon concentration of any dissolved and/or suspended solids in the residuum, i.e., the liquid bottoms removed from separation zone 18, which in turn will depend upon the concentration of such less volatile component in the feed mixture and the solubility characteristics of the residuum. In any event, by proper control of the amount of blowdown via line 62, the recycle stream, which is heated in heating zone 56, can be maintained at near saturation levels without precipitation of any solids. By way of example, a typical feed mixture from a glycol scrubber used to prevent hydrate formation will contain 49.5% by weight monoethylene glycol, 49.5% by weight water, and 1% by weight sodium chloride. To prevent saturation of the glycol residuum and precipitation of salt, estimated at 8% by weight, a 15% blowdown stream relative to feed to the separation zone is removed on a continuous basis such that the residuum will not exceed the concentration of near 6% by weight or 6 times concentration. The resulting equilibrium residuum will have a composition of about 93% by weight glycol, 1% by weight water, and 6% by weight salt. This purge of residuum, coupled with the high flow rates through heating zone 56, permits the application of sufficient heat energy into recirculating fluid in recycle stream 14 to supply all of the heat necessary to effect vaporization in separating zone 18 without permitting precipitation of dissolved solids, which would greatly reduce efficiencies and could render the portion of the residuum being recycled via lines 50, 54, 14, and 16 virtually unpumpable. Thus, by using the process of the present invention, as depicted in FIG. 1, and when the feed mixture contains relatively small amounts of dissolved solids, it is possible to recover 95% or more of the processing liquid on a continuous basis.

It was observed in U.S. Pat. No. 5,389,208 that flow rate through the recirculating liquid or residue (in this case, the residuum) through the heater tubes of heating zone 56 should be at least 6 feet per second, and more preferably 7 to 10 feet per second. Indeed, in the case where the heater tubes forming heater zone 56 are of carbon steel, flow velocities in excess of about 10 feet per second are conventionally thought to be highly erosive, and therefore other materials of construction, such as hardened steel alloys or the like, are used. Nonetheless, it was unexpectedly and surprisingly found that flow rates in excess of 10 feet per second and preferably 11 to 16 feet per second through the heater tubes could be achieved even though the heater tubes are made of carbon steel and that little or no erosive effect on the tubes is observed. This unexpected result is believed to be a function of controlling the solids in the recycled residuum by means of the blowdown through line 62, as well as by controlling the flow rate, pressure, and temperature in heating zone 56.

Figure 2:
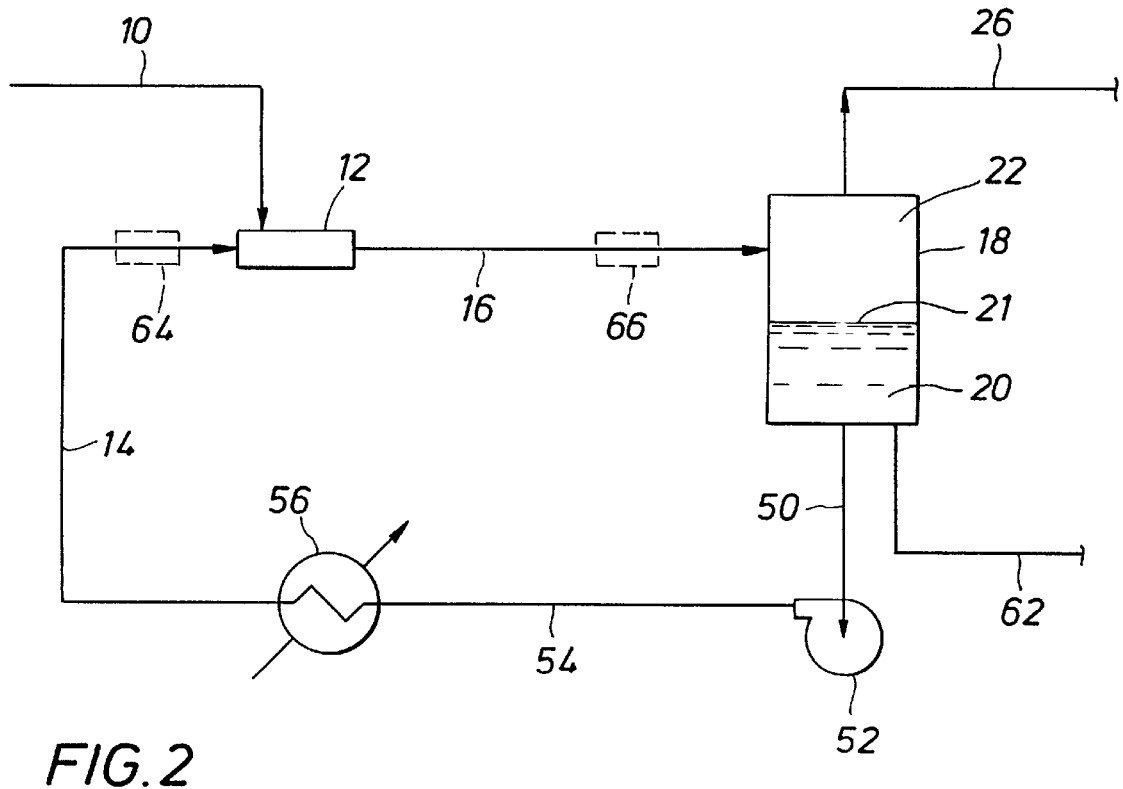
FIG. 2 is a schematic, flow diagram of another embodiment of the process of the present invention.

With reference now to FIG. 2, there is shown another embodiment of the present invention wherein back pressure regulation is used in conjunction with high flow rates and process purging or blowdown. Additionally, although it could be incorporated, the embodiment shown in FIG. 2 does not use foam suppression as is shown in the embodiment of FIG. 1. In one case, in the embodiment shown in Fig. 2, the composition of the feed mixture entering line 10 is basically the same as described with respect to the embodiment of FIG. 1, i.e., having a relatively low content of dissolved and/or suspended solids. As with the embodiment of FIG. 1, it will be appreciated that the vapors passing out of separation zone 18 via line 26 pass into the second separation zone as described above with respect to FIG. I and accordingly will not be further described with respect to the embodiment shown in FIG. 2. In the embodiment shown in FIG. 2, back pressure regulation is employed to avoid several problems that can lead to decomposition of the processing liquid, inefficient process operation, two-phase flow in the heater tubes and connecting piping in the recirculating loop through which the residuum flows, and several other problems. Back pressure regulation can be employed at several locations in the recirculating loop, its preferred location being dependent upon the content of the less volatile components, particularly the content of dissolved and/or suspended solids in the feed mixture and the solubility characteristics of the residuum. Preferably, in the case when the dissolved and/or suspended solids content of the feed mixture and hence the residuum is relatively low, i.e., on the order of less than about 10,000 ppm by weight, back pressure regulation is best effected between heater 56 and line mixer 12. By imposing back pressure regulation on heater 56, two-phase flow through the tubes in heater 56 is substantially avoided. This is desirable since once two-phase flow commences, the back pressure on the main circulation pump 52 can become irregular, resulting in a detrimental effect on the circulating residuum, evidenced by a further reduction of pressure within the heater tubes. This reduction in pressure in the heating tubes and an increase in temperature, in addition to accelerating vaporization at the tube walls and creating two-phase flow, results in fluid velocities that cause process upsets and instabilities, surface scaling on the tube walls, and premature metal failure. Additionally, two-phase flow via vaporization of the residuum at the interface of the inner tube walls reduces the heat transfer efficiency in heater 56. Accordingly, by maintaining back pressure regulation in the tubes in heater 56, more uniform flow and controlled temperature use of residuum through the heater tubes is achieved. Thus, rather than having annular fluid flow in which an annulus of vapor (likely to decompose) is flowing adjacent the tube walls and a core of residuum liquid is flowing through the central part of the tubes, essentially the annulus of gas or vapor is eliminated, i.e., the tube walls remain wetted. In this case, since the circulating residuum passing through heater 56 contains dissolved and/or entrained solids, this flashing at the inner tube walls, while not only leading to possible decomposition of the processing liquid, also contributes to fouling or coking on the inner tube walls by the dissolved and/or suspended solids precipitating from the circulating residuum.

Preferably, back pressure regulation is effected by means of a flow restrictor, which, to the extent possible, provides streamline or viscous flow and minimizes turbulent flow. For example, a suitable flow restrictor to effect back pressure regulation comprises a Venturi flow restrictor. Other typos of back pressure regulators or flow restrictors that prevent or minimize downstream turbulent flow can be used, as is well known by those skilled in the art.

It is important that any vaporization of residuum in the lines connecting separation zone 18 and mixer 12 be minimized and ideally eliminated. Accordingly, it is preferred that any back pressure regulation be effected as close as reasonably possible to the inlet of mixer 12 to ensure that no vaporization occurs not only in the tubes of heater 56, but also in the connecting piping between heater 56 and mixer 12. Accordingly, the length of connecting piping between heater 56 and mixer 12 is minimized, which further reduces the likelihood of vaporization and concomitant two-phase flow.

In cases where the feed mixture contains a relatively high dissolved and/or suspended solid content, i.e., greater than about 10,000 ppm by weight of the feed mixture, it is more desirable that back pressure regulation be effected downstream of mixer 12, i.e., between mixer 12 and separation zone 18. Such a back pressure regulation zone is shown generally in phantom as 66. Once again, any type of flow restrictor or back pressure regulator, which does not impart turbulent flow to the combination of the feed mixture and the recycle stream flowing through line 16 into separation zone 18 can be employed. In any event, whether back pressure regulation be effected between mixer 12 and heater 56, or between mixer 12 and separation zone 18, the net effect is the same, i.e., to minimize or prevent vaporization of liquid in the circulating loop comprising line 50, pump 52, heater 56, line 14, mixer 12, and line 16, especially in the tubes in heater 56.

As discussed above with respect to the embodiment of FIG. 1, the content of less volatile components in the residuum is controlled by means of a blowdown through line 62.

It is apparent that the process of the present invention involves vacuum distillation as supplied by vacuum pump 38. Thus, separation zone 18 is operated under vacuum conditions, and mixer 12 is also under vacuum conditions when back pressure regulation is effected between heater 56 and mixer 12, i.e., at location 64, as shown in FIG. 2. However, when back pressure regulation is effected between mixer 12 and separation zone 18, i.e., at location 66, mixer 12 is then under positive pressure.

Figure 3:
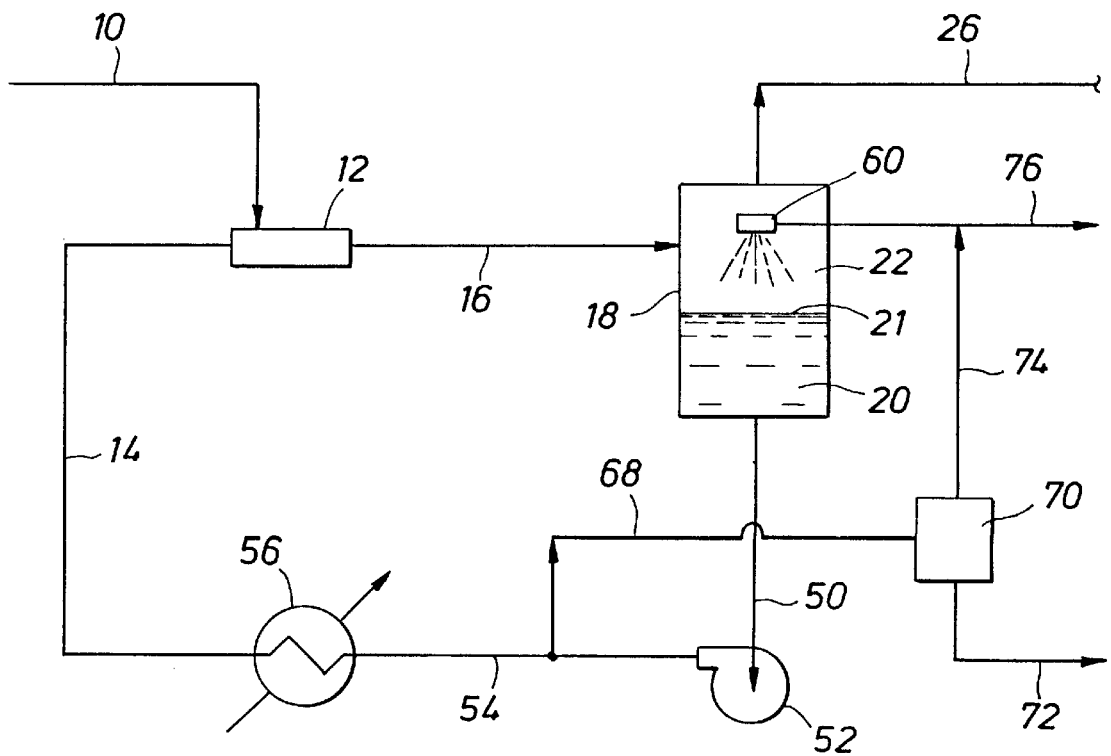
FIG. 3 is a schematic, flow diagram of yet another embodiment of the process of the present invention.

With reference now to FIG. 3, there is shown another embodiment of the present invention wherein precipitated or filterable solids are continuously removed from the system. As in the case of the embodiment shown in FIG. 1, the second separation zone depicted in FIG. 1 is used in the embodiment of FIG. 3 and accordingly will not be discussed with reference to the embodiment of FIG. 3. Additionally, as can be seen, the embodiment of FIG. 3 incorporates foam suppression, albeit a modified form of that shown in FIG. 1. In the case of the embodiment shown in FIG. 3, the feed mixture would typically contain a high concentration of less volatile components, i.e., from 3 to 30% by weight. For example, a glycol mixture used to prevent gas hydrate formation in a natural gas processing operation would typically contain high dissolved solids such as alkali metal halides, carbonates, etc., on the order of 6 to 15% by weight.

With reference then to FIG. 3, a slip stream of the residuum in line 54 is diverted via line 68 to a solids/liquid separation device 70 wherein solids are separated and removed as a slurry or substantially dry cake via line 72, leaving a substantially solids-free liquid portion of the residuum that is removed from solids/liquid separator 70 via line 74. The solids-free stream in line 74 is introduced into separation zone 18 as a foam suppressant via spray head 60, as described above with respect to the embodiment of FIG. 1. The amount of residuum in line 54 that is diverted to solids/liquid separator 70 will depend upon the solids content of the residuum and the performance characteristics of the separator. Generally, however, the amount of residuum that is sent to the solids/liquid separator via the slip stream in line 68 will range from about 1 to about 90% by weight of the total volume of residuum passing out of separation zone 18 via line 50, more preferably from about 1 to about 40% by weight, most preferably from about 5 to about 15% by weight. Suitable solids/liquid separating devices that can be employed include cyclones, screeners, centrifuges, etc.

The continuous removal of solids from the recirculating residuum accomplished by the embodiment of FIG. 3 maintains the circulating residuum fluid and pumpable and ensures that the high, annular velocities through heater 56 can be maintained.

It will be understood that the embodiment of FIG. 3 can be carried out without the necessity for reintroducing the liquids separated in solids/liquid separator 70 as a foam suppressant, e.g., it can simply be recycled to mixer 12 or to other locations in the system. It will also be appreciated that, although not shown, back pressure regulation can be used advantageously in the embodiment of FIG. 3 to further ensure no in-line vaporization, with resulting dual-phase flow through heater tubes 56 and the piping in the circulating loop.

If the amount of processing liquid carried over in the vapor stream via line 26 is essentially negligible, then at least a portion of the solids-free stream in line 74 is removed from the system via line 76 and returned to the gas processing unit from which the feed mixture originated. In this regard, it will be appreciated that the mass balance between the feed mixture coming into line 10 and all of the streams out of the system will be maintained with respect to all of the embodiments shown.

While, as noted above, the process of the present invention is applicable to a wide range of processing liquids, it is particularly useful for processing liquids used in processes involving the production, transportation, and use of natural gas. Thus, the process finds particular utility when the processing liquid comprises a compound(s) such as a liquid, water-soluble alkanolamine containing from 1 to 8 carbon atoms; a liquid, water-soluble amine containing from 1 to 6 carbon atoms; a water-miscible alcohol containing from 1 to 6 carbon atoms; and/or a glycol containing from 2 to 8 carbon atoms.

It will be appreciated that, while not shown in any of the drawings, valves, level controllers, reboiling loops, and other conventional processing equipment can be incorporated in a manner well known to those skilled in the art to optimize the process of the present invention such that the process can be conducted in a continuous fashion with maximum efficiency. For example, a reboiler could be incorporated into concentrator distiller 28 to add additional heat.

It will thus be seen that the process of the present invention makes it possible to continuously recover processing liquids, whether such liquids contain a relatively small amount of dissolved and/or entrained solids or a relatively large amount of dissolved and/or entrained solids. Indeed, by incorporating purge or blowdown with the high flow rates through heater 56 and back pressure regulation, in the case where the feed mixture contains relatively small amounts of the less volatile, dissolved and/or entrained component, recoveries of the processing liquid of 95% or greater can be achieved. Likewise, by incorporating the solids/liquid separation shown in FIG. 3 with back pressure regulation and high fluid flows in heater 56, processing liquid recoveries of 95% or greater can be accomplished from feed mixtures containing substantial amounts of dissolved and/or suspended solids.

The foregoing description and examples illustrate selected embodiments of the present invention. In light thereof, variations and modifications will be suggested to one skilled in the art, all of which are in the spirit and purview of this invention.

What is claimed is:

1. A continuous process for recovering a processing liquid from a feed mixture, comprising said processing liquid, at least one component that is more volatile than said processing liquid, and at least one component that is less volatile than said processing liquid, comprising:

introducing said feed mixture into a first heating zone and initially heating said feed mixture to a temperature sufficient to volatilize at least some of said at least one more volatile component and at least a portion of said processing liquid, said temperature in said first heating zone being below the decomposition temperature of said processing liquid, to produce a vapor stream comprising said at least one more volatile component and said vaporized portion of said processing liquid, and a residuum containing said processing liquid, a reduced concentration of said at least one more volatile component, and said at least one less volatile component;

separating said vapor stream from said residuum in a first separation zone to produce a separated residuum;

passing a first portion of said separated residuum through a second heating zone at a temperature below the decomposition temperature of said processing liquid to produce a heated, first recycle stream;

admixing said heated, first recycle stream with said feed mixture to effect said initial heating of said feed mixture;

passing a second portion of said separated residuum through a solids/liquid separation zone to remove any solids present in said second portion of said separated residuum and produce a substantially solids-free, second recycle stream, said second recycle stream being recycled to said first separation zone; and recovering processing liquid from said vapor stream.

2. The process of claim 1 wherein said first separation zone includes an upper, substantially vapor phase zone and a lower, substantially liquid phase zone and wherein said second recycle stream is introduced into said vapor phase zone and sprayed downwardly toward the interface of said vapor phase zone and said liquid zone to control foaming in said first separation zone.

3. The process of claim 1 wherein said second heating zone comprises a tubular heating zone and said separated residuum is passed through said second heating zone at a flow rate of greater than 10 feet per second, the pressure inside the second heating zone being regulated by back pressure regulation to minimize vaporization in said second heating zone.

4. The process of claim 3 wherein said separated residuum is passed through said second heating zone at a flow rate of from about 11 to about 16 feet per second.

5. The process of claim 3 wherein said back pressure regulation is effected between said second heating zone and said first heating zone, said initial heating of said feed mixture and said separating in said first separation zone being conducted under vacuum conditions.

6. The process of claim 3 wherein said back pressure regulation is effected between said first heating zone and said first separation zone, said first heating zone being under positive pressure, said separating in said first separation zone being conducted under vacuum conditions.

7. The process of claim 1 wherein said feed mixture comprises from about 3 to about 30% by weight of said at least one less volatile component.

8. The process of claim 1 wherein said feed mixture comprises from about 10 ppm to about 60,000 ppm by weight of said less volatile component.

9. The process of claim 1 wherein said vapor stream contains a plurality of said more volatile components and said vapor stream is introduced into a second separation zone to recover processing liquid vaporized in said first separation zone.

10. The process of claim 1 wherein said feed mixture comprises water and a substantially clean water stream is recovered from said second separation zone.

11. The process of claim 1, wherein said any solids are initially present in said feed mixture.

12. The process of claim 1, wherein said any solids are formed from said less volatile component.

13. The process of claim 1, wherein said processing liquid comprises a gas scrubbing medium.

14. The process of claim 1, wherein said processing liquid is selected from the group consisting of alkanolamines containing from 1–8 carbon atoms, water soluble amines containing from 1–6 carbon atoms, water-miscible alcohols containing from 1–8 carbon atoms, glycols containing from 2–8 carbon atoms and mixtures thereof.

15. The process of claim 1 wherein said less volatile component comprises a liquid.

* * * * *

UNITED STATES PATENT AND TRADEMARK OFFICE
CERTIFICATE OF CORRECTION

PATENT NO. : 5,993,608
DATED      : November 30, 1999
INVENTOR(S): Raymond G. Abry; Todd S. Beasley; Stephen W. Carlson; Stephen G. Kresnyak It is certified that error appears in the above-identified patent and that said Letters Patent is hereby corrected as shown below:

In column 12, line 37, change "1-8" to "1-6".

Signed and Sealed this

Fifteenth Day of August, 2000

Attest:

Q. TODD DICKINSON

Attesting Officer

Director of Patents and Trademarks